United States Patent [19]

Schott

[11] 4,409,491

[45] Oct. 11, 1983

[54] AC FREQUENCY AND PHASE SYNCHRONIZER

[76] Inventor: Lawrence A. Schott, 15940 Warwick Rd., Detroit, Mich. 48223

[21] Appl. No.: 453,619

[22] Filed: Dec. 27, 1982

[51] Int. Cl.³ .............................................. H04B 3/44
[52] U.S. Cl. ..................................... 307/77; 310/114; 307/87
[58] Field of Search ...................... 307/77, 78, 87, 116; 310/112, 114

[56] References Cited

U.S. PATENT DOCUMENTS

| | | | |
|---|---|---|---|
| 4,249,088 | 2/1981 | Kleba et al. | 307/87 |
| 4,333,021 | 6/1982 | Cresap et al. | 307/87 |

FOREIGN PATENT DOCUMENTS 52-21610  2/1977  Japan .
843099  6/1981  U.S.S.R. .

*Primary Examiner*—Elliot A. Goldberg
*Assistant Examiner*—D. Jennings
*Attorney, Agent, or Firm*—Barnes, Kisselle, Raisch, Choate, Whittemore & Hulbert

[57] ABSTRACT

A system for detecting frequency and phase-angle synchronism between local and utility power sources comprising a pair of identical permanent magnet synchronous motors respectively connected to the power sources and having output shafts in opposed alignment. Fingers mounted on the motor shafts effect electrical interconnection between the motor housings, which are ungrounded, when the power signals are at identical frequency and in phase. An SCR is responsive to such interconnection to energize a relay and interconnect the power sources.

14 Claims, 2 Drawing Figures

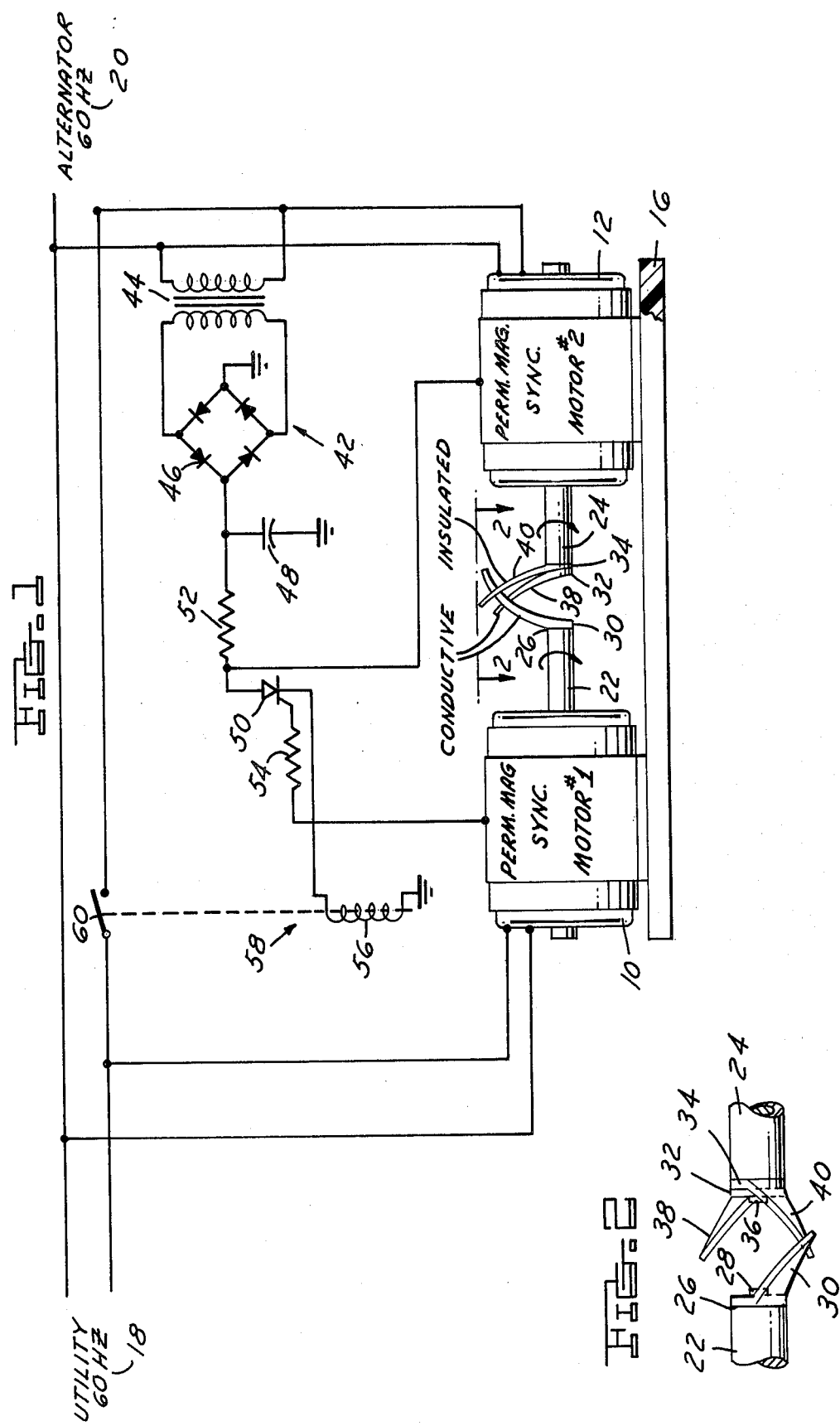

AC FREQUENCY AND PHASE SYNCHRONIZER

The present invention relates to electrical power generation, and more particularly to a system for connecting locally generated power to an active power line when frequency and phase angle of the locally generated power match those on the power line.

There is a desire on the part of many owners or operators of local power generation facilities, such as windmills or solar generators, to feed excess power to the utility power lines and thereby sell excess power to the utility company. It is necessary in such applications to insure that the locally generated power is synchronized in frequency and phase angle with utility power before such connection takes place. A general object of the present invention is to provide a simple and economical system for detecting such frequency and phase synchronism, and to connect the locally generated power to the utility lines when such synchronism takes place.

The invention, together with additional objects, features and advantages thereof, will be best understood from the appended claims and the following description read in conjunction with the accompanying drawing in which:

FIG. 1 is a partially schematic and partially elevational diagram of a presently preferred embodiment of the invention; and FIG. 2 is a plan view of a portion of FIG. 1 taken from the direction 2—2 in FIG. 1.

Referring to the drawing, a pair of permanent magnet synchronous motors 10, 12 are mounted on a block or stand 16 of insulating material. Motors 10, 12 have a.c. power inputs connect to utility power 18 and locally generated alternator power 20 respectively, and have output shafts 22, 24 in opposed coaxial alignment. Most preferably, motors 10, 12 comprise identical so-called "electrically reversible" 60 Hz motors, and are preset to run in opposite directions. FIG. 1 illustrates motor 10 set to run counterclockwise as viewed from the shaft end, and motor 12 set to run clockwise.

A disc 26 is mounted by a screw 28 onto the axial end of shaft 22 and has an arcuate finger 30 integrally projecting axially and radially therefrom. Disc 26 and finger 30 are constructed of electrically conductive material and are electrically connected by screw 28 to shaft 22 and to the housing of motor 10, which is ungrounded. A pair of discs 32, 34 are mounted in axial facing abutment on shaft 24 by the screw 36. Discs 32, 34 have the respective angularly spaced fingers 38, 40 integrally projecting axially and radially therefrom. Disc 32 and its finger 38 are constructed of electrically conductive material and are electrically connected by screw 36 to shaft 24 and the housing of motor 12, which is ungrounded. Disc 34 and finger 40 are preferably constructed of electrical insulating material. At least finger 30, and preferably all fingers 30, 38, 40, are angularly adjustable on the respective shafts.

A d.c. power supply 42 includes a transformer 44 having a primary connected to receive local alternator power 20 and a secondary connected to a diode rectifier bridge 46. Bridge 46 is connected across a filter capacitor 48 to provide a stable d.c. voltage. The anode of an SCR 50 is connected through a resistor 52 to d.c. supply 42 and to the ungrounded metal housing or casing of motor 12. The gate of SCR 50 is connected through a resistor 54 to the ungrounded metal housing or casing of motor 10. The cathode of SCR 50 is connected through the coil 56 of a relay 58, which has a normally-open relay switch 60 connected between utility and alternator power.

In operation, motors 10, 12 are first adjusted so that conductive fingers 30, 38 are just in contact when the utility and alternator a.c. signals are just synchronized. This is accomplished by placing d.c. power across the input leads of each motor. Since the motors are permanent magnet motors, the motor output shafts will automatically assume an angular orientation corresponding to alignment of the rotor with a stator pole. With the shafts thus held in position, conductive finger 30 and/or conductive finger 38 is adjusted so that these fingers are in contact, with finger 30 positioned on a side of finger 38 corresponding to the direction of shaft rotation. Insulated finger 40 is then adjustably spaced from finger 38 by an angle in the direction of rotation corresponding to the angular spacing between adjacent motor poles. The d.c. power is then removed from both motors, and the system is ready for operation.

With the system connected as shown in the drawing, and when the local alternator power source 20 first begins operation, utility frequency (60 Hz) will be substantially greater than the alternator frequency, and the shaft of "utility" motor 10 will drive the shaft of "local" motor 12 through abutment of finger 30 against insulated finger 40. The gate of SCR 50 is open or unpowered, the SCR and relay coil 56 are not energized, and switch 60 remains open.

When the frequency of local alternator power 20 increases to the frequency of the utility source, motor 12 takes over, rotating shaft 24 until the conductive fingers 30, 38 come into electrical and mechanical contact. The above-described set up of motors 10, 12 insures that this contact will take place at the peak of the first positive a.c. half-cycle following frequency equality. The gate of SCR 50 is thus connected to d.c. power through resistor 54, the metal housing of motor 10, motor shaft 22, contacting fingers 30, 38, shaft 24, the metal housing of motor 12 and resistor 52. The SCR fires, energizing relay coil 56 and closing switch 60. Local alternator power source 20 is thus connected to the utility power lines 18.

It will be appreciated that the dispositions of fingers 30, 38 and 40 on shafts 22, 24 could be reversed. That is, conductive fingers 30 could be mounted on shaft 24 and conductive/non-conductive finger pair 38, 40 could be mounted on shaft 24. In this case, non-conductive finger 40 would be spaced from conductive finger 38 in a direction opposing rotation, so that non-conductive finger 40 would drive finger 38 until local motor 12 takes over. It will also be appreciated that fingers 38, 40 could be formed integrally with a single conductive disc, with finger 40 being covered by suitable insulating material.

Electromagnetic relay 58 could be replaced by an appropriate solid state relay. Relay 58 could also be a latching relay having normally closed switch contacts connected to feed power to motors 10, 12. In this modification, power would be removed from the motors as soon as the power sources were in synchronism and connected. It will also be recognized that the single-phase a.c. system of the drawing could be used in one phase of a three-phase power system where desired. Other synchronism-detecting circuit arrangements could be employed wherein one of the motor housings is grounded, for example.

The invention claimed is:

1. A system for detecting frequency and phase synchronism between two a.c. power sources comprising a pair of dynamo-electric motors each having an electrically conductive housing and an output shaft, means mounting said motors with said output shafts in opposed coaxial orientation and with at least one of said motor housings ungrounded, means for connecting said motors to respective ones of said power sources such that said opposed shafts are adapted for rotation in opposite directions, means mounted on said opposed shafts and responsive to electrical synchronism between said sources for effecting a change in electrical interconnection between said motor housings through said shafts, and means responsive to said change in electrical interconnection of said housings through said shafts for indicating such electrical synchronism.

2. The system set forth in claim 1 wherein said means mounted on said opposed shafts is responsive to said synchronism for electrically connecting said shafts and said motor housings.

3. The system set forth in claim 2 wherein said dynamo-electric motors comprise respective permanent magnet synchronous motors.

4. The system set forth in claim 3 wherein said means mounted on said opposed shafts comprises electrically conductive first means radiating from one of said shafts and electrically connected to the corresponding said motor housing, angularly spaced abument means mounted on the other of said shafts such that said first means is positioned between said abutment means, one of said abutment means being electrically insulated from said other housing.

5. The system set forth in claim 4 for interconnecting said power sources when said power sources are in frequency and phase synchronism, said system further comprising electrical circuit means including said indicating means responsive to said electrical interconnection and switch means responsive to said indicating means for connecting said power sources.

6. The system set forth in claim 5 wherein said electrical circuit means includes means electrically connecting said indicating means to said motor housings.

7. A method of sensing frequency and phase synchronism between two sources of a.c. power comprising the steps of:
(a) mounting a pair of permanent magnet synchronous motors with at least one motor housing insulated from electrical ground and with the motor shafts in opposed coaxial alignment,
(b) connecting said motors to respective ones of said power sources so that said shafts rotate in opposite directions,
(c) providing angularly spaced electrically conductive means on said opposed shafts, and
(d) detecting electrical synchronism between said sources in response to abutment of said conductive means and consequent electrical interconnection between said motor housings.

8. A system for detecting frequency and phase synchronism between two a.c. power sources comprising a pair of dynamo-electric motors each having an output shaft, means mounting said motors with said output shafts in opposed operative orientation, means for connecting said motors to respective ones of said power sources, means mounted on said opposed shafts and responsive to electrical synchronism between said sources for effecting a change in electrical interconnection between said shafts, and means responsive to said change in electrical interconnection for indicating such electrical synchronism.

9. A system for detecting frequency and phase synchronism between two a.c. power sources comprising a pair of dynamo-electric motors with output shafts facing each other, means for connecting said motors to respective ones of said power sources such that said opposed shafts are adapted for rotation in opposite directions, means mounted on said opposed shafts and responsive to frequency electrical synchronism between said sources for effecting a change in an electrical connection between said motor shafts, and means responsive to said change in electrical interconnection of said means through said shafts for indicating such electrical synchronism.

10. The system set forth in claim 9 wherein said means mounted on said opposed shafts is responsive to said synchronism for electrical connection.

11. The system set forth in claim 10 wherein said means mounted on said opposed shafts comprises electrically conductive first means radiating from one of said shafts and electrically connected to the corresponding said motor shaft, angularly spaced abutment means mounted on the other of said shafts such that said first means is positioned between said abutment means, one of said abutment means being electrically insulated from said other housing.

12. The system set forth in claim 11 for interconnecting said power sources when said power sources are in frequency and phase synchronism, said system further comprising electrical circuit means including said indicating means responsive to said electrical interconnection and switch means responsive to said indicating means for connecting said power sources.

13. The system set forth in claim 12 wherein said electrical circuit means includes means electrically connecting said indicating means to said motor shaft.

14. A method of sensing frequency and phase synchronism between two sources of a.c. power comprising the steps of:
(a) mounting a pair of permanent magnet synchronous motors with at least one motor housing insulating from electrical ground and with the motor shafts in opposed coaxial alignment,
(b) connecting said motors to respective ones of said power sources so that said shafts rotate in opposite directions,
(c) providing angularly spaced electrically conductive means on said opposed shafts, and
(d) detecting electrical synchronism between said sources in response to abutment of said conductive means and consequent electrical interconnection between said shafts.

* * * * *